Patented Apr. 12, 1949

2,467,262

UNITED STATES PATENT OFFICE 2,467,262

STILBENE TRIAZOLE AZO DYES

Arthur Howard Knight, Blackley, Manchester, England, assignor to Imperial Chemical Industries Limited, a corporation of Great Britain No Drawing. Application April 2, 1946, Serial No. 659,147. In Great Britain April 11, 1945

5 Claims. (Cl. 260—143)

This invention relates to the manufacture of new stilbene dyestuffs.

In British Specification No. 311,384 it has been proposed to manufacture cotton dyestuffs by condensing one molecular proportion of dinitrostilbene disulphonic acid or dinitrobenzyl disulphonic acid or the conversion products of p-nitrotoluene sulphonic acid with 2 molecular proportions of an aminoazo dyestuff with or without subsequent treatment of the product with an agent yielding metal or with an oxidising agent.

It has also been proposed in British Specification No. 348,283 to manufacture dyestuffs by condensing under pressure 4:4'-dinitrostilbene-2:2'-disulphonic acid or 4:4'-dinitrobenzyl-2:2'-disulphonic acid, or a conversion product of p-nitrotoluene sulphonic acid, with an organic compound containing one or more amino groups, such as an aminoazo dyestuff, in any desired proportion, and, if desired, treating the product with an oxidising agent, or with an agent yielding metal or with both.

It has not hitherto been known to employ in the above reactions aminostilbene triazoles of the type defined below.

According to the present invention we manufacture new stilbene dyestuffs by a process which comprises condensing in the presence of caustic alkalies 4:4' - dinitrostilbene - 2:2' - disulphonic acid, 4:4'-dinitrodibenzyl-2:2'-disulphonic acid or the conversion products obtained by the action of caustic alkalies on 4-nitrotoluene-2-sulphonic acid, with or without the application of pressure, and not more than 1.5 and not less than 0.5 molecular proportions per molecular proportion of the aforesaid reactants of an aminotriazole (P) of the formula

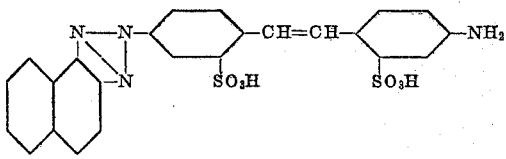

which in the naphthalene nucleus contains at least one water-solubilising group, for example, a carboxylic or sulphonic acid radical, but no amino or substituted amino groups, together with an aminoazo compound (Q) of the formula

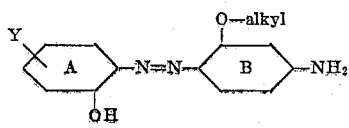

wherein Y stands for a sulphonic acid group or a carboxyl group, or with the copper complex of this aminoazo compound provided that the sum of the molecular proportions of P and Q does not exceed 2 per molecular proportion of the aforesaid 4,4'-dinitrostilbene-2,2'-disulfonic acid or its equivalent. In so far as metallisable groups are still present, the products so-obtained are treated with copper yielding agents and if desired with a mild oxidising agent.

The benzene nuclei of the aminoazo compound may be further substituted provided that the nucleus which contains the amino group does not contain substituents in such positions as to prevent the formation of the aminoazobenzene compound. Moreover, the amino group may contain substituents which are capable of being split off by alkalies. The condensation of these amino compounds with 4:4'-dinitrostilbene-2:2'-disulphonic acid or its equivalents may be carried out according to any known methods for the production of stilbene dyestuffs. The reaction may thus be carried out at the boil under ordinary atmospheric pressures or under superatmospheric pressures. Mixtures of two or more of the aminotriazoles of the above formula may be used. Also, mixtures of two or more of the aminoazo compounds of the above formula may be used.

Particularly suitable copper-yielding agents are water-soluble copper salts.

The amino-triazoles used in the process of the invention may be made by known methods; for example, monoazo compounds obtained by coupling diazotised 4-nitro-4'-aminostilbene-2:2'-disulphonic acid with such naphthylamino derivatives as are capable of coupling in the ortho position to the amino group may be treated with oxidising agents for example sodium hypochlorite, copper salts, or chlorine, to give the nitrotriazoles which may then be reduced to corresponding aminotriazoles. As examples of naphthylamino derivatives which may be employed there may be mentioned 1-naphthylamine-4-sulphonic acid, 2-naphthylamine-5, -6-, and -7-monosulphonic acids, 2-naphthylamine-3:6-, -5:7-, and -6:8-disulphonic acids, 2-amino-3-naphthoic acid.

The aminoazo compounds which may be used in the process of the invention may be prepared by known methods for example by coupling the appropriate ortho substituted diazonium compound with the appropriate meta substituted aniline. The said meta substituted aniline may be used if desired in the form of its N-methane-ω-sulphonate and the resulting product may if desired be used as such in the process of the invention when the N-methane-ω-sulphonate group hydrolyses by aid of the alkali present. Alternatively the N-methane-ω-sulphonate may be removed by hydrolysis before the process of the invention is carried out.

Appropriate ortho substituted diazonium compounds may be those obtainable by known means from, for example, the following amines: 2-aminophenol-4-sulphonic acid, 2-aminophenol-4:6-disulphonic acid, 4-chloro-2-aminophenol-6-sulphonic acid, 6-chloro-2-aminophenol-4-sulphonic acid, 3-amino-2-hydroxy-5-sulphobenzoic acid, 3-amino-4-hydroxybenzoic acid, 4-chloro-2-aminophenol-5-sulphonic acid.

Suitable meta substituted anilines include for example: m-anisidine, m-anisidine-N-methane sulphonate, m-phenetidine, 1-amino-2-methyl-5-methoxybenzene and 2:5-dimethoxyaniline.

The new dyestuffs dye cellulosic materials, for example cotton, in various shades of brown and olive. The dyeings have good fastness to light, water and washing. The new dyestuffs are distinguished from the metallised dyestuffs known from the aforementioned Specifications Nos. 311,384 and 348,283 by a superior fastness to washing and a greater capacity to leave the wool of a wool/cotton mixture or union material unstained when dyed at low temperatures such as for example at about 45° C.

The invention is illustrated, but not limited, by the following examples in which the parts are by weight.

*Example 1*

66.8 parts of the tri-sodium salt of the amino triazole obtained by oxidation of the monoazo compound obtained by coupling diazotised 4 - nitro-4'-aminostilbene-2:2'-disulphonic acid with 2-naphthylamine-6-sulphonic acid and reducing the so obtained nitro compound to the corresponding amino compound, 34.5 parts of the sodium salt of the monoazo compound obtained by coupling diazotised 2-aminophenol - 4 - sulphonic acid with m-anisidine, 47.4 parts of the disodium salt of 4:4'-dinitrostilbene-2:2'-disulphonic acid, 850 parts of water and 140 parts of 10 N aqueous caustic soda are boiled together under reflux for 15 hours. The mixture is cooled, nearly neutralised with hydrochloric acid, and sodium chloride is added after which the precipitate is filtered off and washed with 10% aqueous sodium chloride. It is dissolved in 1500 parts of water at 85–90° C. and a solution of 25 parts of crystalline copper sulphate in 100 parts of water and 45 parts of 35% aqueous ammonia is added. The mixture is heated at 90°–95° C. for 12–15 hours. It is then cooled, sodium chloride is added (15% weight for volume) and the precipitated metallised dyestuff filtered off, washed with 15% aqueous sodium chloride and dried. It consists of a dark brown powder which dissolves in water to give a reddish-brown solution and in concentrated sulphuric acid to give a reddish-blue solution. It dyes cotton in brown shades of very good fastness to washing, organic acids, alkalies and light.

*Example 2*

In Example 1, the 34.5 parts of the sodium salt of the monoazo compound obtained by coupling diazotised 2-aminophenol-4-sulphonic acid with m-anisidine are replaced by 37.5 parts of the sodium salt of the monoazo compound obtained by coupling diazotised 2-aminophenol-4-sulphonic acid with 2:5-dimethoxyaniline.

The metallised dyestuff so obtained consists of a black-brown powder which dissolves in water to give an olive-green solution and in concentrated sulphuric acid to give a reddish-blue solution. It dyes cotton and other cellulosic fibres in olive shades of very good fastness to water, washing, organic acids and light, and possesses very good "resist" properties for the wool of wool-cotton mixtures or union materials when dyed at low temperatures.

*Example 3*

66.8 parts of the tri-sodium salt of the aminotriazole obtained by oxidation of the monoazo compound obtained by coupling diazotised 4 - nitro-4'-aminostilbene-2:2'-disulphonic acid with 1-naphthylamine-4-sulphonic acid and reducing the so-obtained nitro compound to the corresponding amino compound, 37.5 parts of the sodium salt of the monoazo compound obtained by coupling diazotised 2-aminophenol-4-sulphonic acid with 2:5-dimethoxyaniline, 47.4 parts of the disodium salt of 4:4'-dinitrostilbene-2:2'-disulphonic acid, 800 parts of water and 150 parts of 10 N aqueous caustic soda are heated together at the boil for 15–18 hours. The product is isolated as described in Example 1 and the dyestuff so-obtained is coppered as described in Example 1. The isolated metallised dyestuff consists of a black-brown powder which dissolves in water to give an olive-green solution and in concentrated sulphuric acid to give a reddish-blue solution. It dyes cotton in somewhat yellower shades of olive than the dyestuff of Example 2, the dyeings having similar good fastness properties.

*Example 4*

In Example 1, the 34.5 parts of the sodium salt of the monoazo compound obtained by coupling diazotised 2-aminophenol-4-sulphonic acid with m-anisidine are replaced by 38 parts of the sodium salt of the monoazo compound obtained by coupling diazotised 4-chloro-2-aminophenol-6-sulphonic acid with m-anisidine.

The coppered dyestuff so-obtained consists of a dark brown powder which dissolves in water to give a yellowish-brown solution and in concentrated sulphuric acid to give a reddish-blue solution. It dyes cotton in nigger brown shades, the dyeings having very good fastness to light, water and washing.

*Example 5*

In Example 1, the 34.5 parts of the sodium salt of the monoazo compound obtained by coupling diazotised 2-aminophenol-4-sulphonic acid with m-anisidine are replaced by 37.95 parts of the sodium salt of the monoazo compound obtained by coupling diazotised 6-chloro-2-aminophenol-4-sulphonic acid with m-anisidine.

The coppered dyestuff so-obtained consists of a black-brown powder which dissolves in water to give a reddish-brown solution and in concentrated sulphuric acid to give a blue solution. It dyes cotton in somewhat redder shades of brown than the dyestuff of Example 4, the dyeings having similar good fastness properties and a very good capacity to leave the wool of a wool/cotton mixture unstained when dyed at about 40° C.

*Example 6*

66.8 parts of the trisodium salt of the aminotriazole obtained by oxidation of the monoazo compound obtained by coupling diazotised 4-nitro-4' - aminostilbene-2:2' - disulphonic acid with 2-naphthylamine-7-sulphonic acid and reducing the so-obtained nitro compound to the corresponding amino compound, 37.95 parts of the sodium salt of the monoazo compound obtained by coupling diazotised 6-chloro-2-aminophenol-4-sulphonic acid with m-anisidine, 47.4 parts of the disodium salt of 4:4'-dinitrostilbene-2:2'-disulphonic acid, 900 parts of water and 148 parts of 10 N aqueous caustic soda are boiled together under reflux for 18 hours. The mixture is then cooled, neutralised with hydrochloric acid and sodium chloride added (5% weight for volume). The precipitate is filtered off and washed with 5% aqueous sodium chloride. It is then dissolved in 1600 parts of water at 85°–90° C. and a solution of 25 parts of crystalline copper sulphate in 100 parts of water and 45 parts of 35% aqueous ammonia is added. The mixture is heated at 90°–95° C. for 17 hours. It is then cooled, 110 parts of sodium chloride are added and the precipitated coppered dyestuff is filtered off and dried.

The new dyestuff dyes cotton in brown shades, somewhat redder than those given by the dyestuff of Example 1, the dyeings having very good fastness to light and washing.

If in the above example the 6-chloro-2-aminophenol-4-sulphonic acid is replaced by 4-chloro-2-aminophenol-6-sulphonic acid a coppered product is obtained which dyes cotton in bluer shades of brown and "builds up" to give valuable nigger brown shades of good fastness to washing and light.

*Example 7*

The coppered dyestuff obtained by replacing in Example 1 the 66.8 parts of the tri-sodium salt of the amino-triazole employed by the same amount of the corresponding aminotriazole in the formation of which 1-naphthylamine-4-sulphonic acid has been employed in place of the 2-naphthylamine-6-sulphonic acid, is suspended in 2400 parts of water at 50°–60° C., 21 parts of 10 N aqueous caustic soda are added and the whole is heated to 85°–90° C. with stirring. 200 parts of aqueous sodium hypochlorite (containing 14% active chlorine) are then added slowly and heating at 85°–90 C. is continued for a further half hour. The mixture is then cooled and neutralised, and the dyestuff is isolated and dried.

It dyes cotton in brown shades of good fastness to light, washing and organic acids.

*Example 8*

66.8 parts of the tri-sodium salt of the aminotriazole employed in Example 1, 24.15 parts of the sodium salt of the monoazo compound obtained by coupling diazotised 2-aminophenol-4-sulphonic acid with m-anisidine, 11.25 parts of the sodium salt of the monoazo compound obtained by coupling diazotised 2-aminophenyl-4-sulphonic acid with 2:5-dimethoxyaniline, 47.4 parts of the disodium salt of 4:4'-dinitrostilbene-2:2'-disulphonic acid, 800 parts of water and 135 parts of 10 N aqueous caustic soda are boiled together under reflux for 12–15 hours. The mixture is cooled, the alkalinity of the medium nearly neutralised by addition of hydrochloric acid and sodium chloride added. The precipitate is then filtered off and resuspended in 1500 parts of water. The mixture is heated to 90° C. and a solution of 25 parts of crystalline copper sulphate in 100 parts of water and 45 parts of 35% aqueous ammonia is added. Heating is continued at 90°–95° C. for 15 hours. The mixture is then cooled, sodium chloride is added to precipitate the dyestuff which is then filtered off and dried.

It dyes cellulose fibres in bluer shades of brown than the dyestuff of Example 1, the dyeings having similar good fastness properties.

A dyestuff with similar good fastness properties but somewhat yellower in shade when dyed on cellulose fibres is obtained by subjecting the above coppered dyestuff to an aftertreatment with sodium hypochlorite in the manner described in Example 7.

*Example 9*

66.8 parts of the tri-sodium salt of the aminotriazole described in Example 3, 39.5 parts of the sodium salt of the copper complex of the aminoazo compound from diazotised 2-aminophenol-4-sulphonic acid and m-anisidine and 47.4 parts of 4:4'-dinitrostilbene-2:2'-disulphonic acid are condensed in 850 parts of water and 140 parts of 10 N caustic soda at boiling temperature for 12–15 hours. The mixture is cooled and the alkalinity of the aqueous medium nearly neutralised by the addition of hydrochloric acid. The condensation product is salted out by addition of sodium chloride, filtered off and dried.

It dyes cotton in brown shades of good fastness to washing and light.

*Example 10*

63.2 parts of the tri-sodium salt of the aminotriazole obtained by oxidation of the monoazo compound obtained by coupling diazotised 4-nitro-4'-aminostilbene-2:2'-disulphonic acid with 2-amino-3-naphthoic acid and reducing the so-obtained nitro compound to the corresponding amino compound, 34.5 parts of the sodium salt of the monoazo compound from diazotised 2-aminophenol-4-sulphonic acid and m-anisidine, and 47.4 parts of 4:4'-dinitrostilbene-2:2'-disulphonic acid are condensed in 800 parts of water and 140 parts of 10 N aqueous caustic soda in an autoclave by heating at 115°–120° C. for 8–10 hours.

The product is isolated as described in Example 1 and the dyestuff so-obtained is converted into its copper compound as described in Example 1. The isolated coppered dyestuff dyes cotton and other cellulose fibres in brown shades of good fastness to washing, organic acids and light.

*Example 11*

100.2 parts of the tri-sodium salt of the aminotriazole employed in Example 1, 17.25 parts of the sodium salt of the monoazo compound from diazotised 2-aminophenol-4-sulphonic acid and m-anisidine, 47.4 parts of the di-sodium salt of 4:4'-dinitrostilbene-2:2'-disulphonic acid, 900 parts of water and 150 parts of 10 N aqueous caustic soda are boiled together for 14–16 hours. The mixture is cooled, the excess alkali almost neutralised by addition of hydrochloric acid, and sodium chloride added (approx. 10%, weight for volume). The precipitate is then filtered off and washed with 10% brine. It is dissolved in 1400 parts of water at 80°–90° C. and a solution of 12.5 parts of crystalline copper sulphate in 50 parts of water and 22 parts of 35% aqueous ammonia is added. The mixture is stirred and heated at 90°–95° C. for 12–16 hours. It is then cooled, sodium chloride is added and the precipitated dystuff is filtered off, washed with 5% brine and dried.

It consists of a black-brown powder which dissolves in water to give a reddish-brown solution and in concentrated sulphuric acid to give a reddish-blue solution. It dyes cotton in yellowish brown shades of very good fastness to washing and light.

If the above metallised dyestuff is redissolved in 1200 parts of water and 9 parts of 10 N caustic soda at 90°–95° C., and 100 parts of 30% aqueous sodium hypochlorite diluted with an equal amount of water are added slowly heating at 90–95° C. is continued for a further ½ hour, and salt is then added a dyestuff is precipitated which in the dry state consists of a black-brown powder which dissolves in water to give a reddish-brown solution and in concentrated sulphuric acid to give a bluish-violet solution and which dyes cotton in somewhat yellower shades of yellowish-brown of similar good fastness properties.

*Example 12*

33.4 parts of the tri-sodium salt of the aminotriazole employed in Example 1, 56.25 parts of the sodium salt of the monoazo compound obtained by coupling diazotised 2-aminophenol-4-sulphonic acid with 2:5-dimethoxyaniline, 47.4 parts of the disodium salt of 4:4'-dinitrostilbene-2:2'-disulphonic acid, 900 parts of water and 145 parts of 10 N aqueous caustic soda are boiled together under reflux for 15 hours. The mixture is cooled, nearly neutralised with hydrochloric acid, and the condensation product is precipitated by addition of sodium chloride, filtered off, and washed with a little 10% aqueous sodium chloride. It is resuspended in 1500 parts of water, the suspension is heated to 90° C. and a solution of 37.5 parts of crystalline copper sulphate in 150 parts of water and 65 parts of 35% aqueous ammonia is added. The mixture is stirred at 90°–95° C. for 12–15 hours and then cooled. 100 parts of sodium chloride are aded and the precipitated dyestuff is filtered off, washed with 10% aqueous sodium chloride and dried. It consists of a black-brown powder which dissolves in water to give a dull olive solution and in concentrated sulphuric acid to give a violet-grey solution. It dyes cotton in dull olive shades the dyeings having good fastness to washing and very good fastness to light.

*Example 13*

66.8 parts of the tri-sodium salt of the aminotriazole employed in Example 1, 19 parts of the sodium salt of the monoazo compound obtained by coupling diazotised 6-chloro-2-aminophenol-4-sulphonic acid with m-anisidine, 20.45 parts of the sodium salt of the monoazo compound from diazotised 6 - chloro-2-aminophenol-4-sulphonic acid and 2:5-dimethoxyaniline and 47.4 parts of 4:4'-dinitrostilbene - 2:2' - disulphonic acid are condensed by the method described in Example 1. The cooled, nearly neutralised condensation product is salted with 250 parts of sodium chloride and the precipitated dyestuff filtered off and washed with saturated aqueous sodium chloride. It is then dissolved in 1500 parts of water and coppered as described in Example 1.

The product, which has partly precipitated, is salted out completely, filtered off and dried. It consists of a black-brown powder which dissolves in water to give a yellowish-brown solution and in concentrated sulphuric acid to give a reddish-blue solution. It dyes cotton in chocolate brown shades of very good fastness to washing and light.

If, in the above example, the 6-chloro-2-aminophenol-4-sulphonic acid is replaced by 4-chloro-2-aminophenol-6-sulphonic acid a coppered dyestuff is obtained which consists of a dark brown powder which dissolves in water to give a brownish-olive solution and in concentrated sulphuric acid to give a reddish-blue solution. It dyes cotton in olive shades of good fastness to washing and very good fastness to light.

*Example 14*

In Example 2, the 37.5 parts of the sodium salt of the monoazo compound obtained by coupling diazotised 2-amino-phenol-4-sulphonic acid with 2:5-dimethoxyaniline are replaced by 40.9 parts of the sodium salt of the monoazo compound obtained by coupling diazotised 4-chloro-2-aminophenol-6-sulphonic acid with 2:5-dimethoxyaniline. The coppered dyestuff so-obtained, which requires rather more sodium chloride for its precipitation than does the coppered dyestuff of Example 2, dyes cotton in olive shades of very good fastness to light and wet treatments.

I claim:

1. Process for manufacturing a coppered stilbene dyestuff which comprises condensing in the presence of a caustic alkali one molecular proportion of a reactant of the group consisting of 4,4'-dinitrostilbene-2,2'-disulfonic acid, 4,4'-dinitrodibenzyl-2,2'-disulfonic acid and the conversion products obtained by the action of caustic alkalis on 4-nitrotoluene-2-sulfonic acid, with 0.5 to 1.5 molecular proportions of an aminotriazole represented by the formula

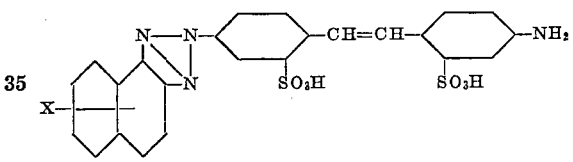

in which X represents at least one water solubilizing radical of the group consisting of carboxy and sulfonic acid, and with another reactant of the group consisting of an aminoazo compound represented by the formula

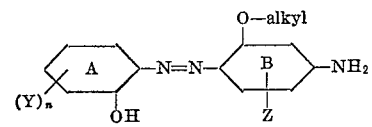

wherein Y represents one of the group consisting of chloro, carboxy and sulfonic acid, $n$ is 1 to 2 and alkyl has 1 to 2 carbons; Z is one of the group consisting of hydrogen, methyl and methoxy; the sum of the molecular proportions of said aminotriazole and the last named reactant being not greater than 2; and finally treating the product thus obtained with a copper yielding agent until 1 atom of copper is combined with each metallizable group.

2. A coppered stilbene dyestuff made by condensing in the presence of a caustic alkali one molecular proportion of 4,4'-dinitrostilbene-2,2'-disulfonic acid with 0.5 to 1.5 molecular proportions of an aminotriazole represented by the formula

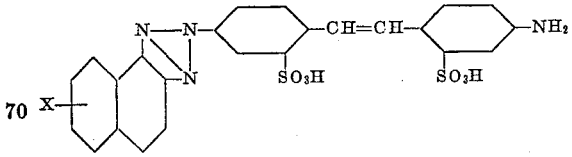

in which X represents at least one water solubilizing radical of the group consisting of carboxy and sulfonic acid, and with another reactant of the group consisting of an aminoazo compound represented by the formula

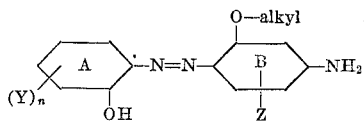

wherein Y represents one of the group consisting of chloro, carboxy and sulfonic acid, $n$ is 1 to 2 and alkyl has 1 to 2 carbons; Z is one of the group consisting of hydrogen, methyl and methoxy; the sum of the molecular proportions of said aminotriazole and the last named reactant being not greater than 2; and finally treating the product thus obtained with a copper yielding agent until 1 atom of copper is combined with each metallizable group.

3. The coppered stilbene dyestuff made by condensing in the presence of a caustic alkali 66.8 parts of the trisodium salt of the aminotriazole represented by the formula

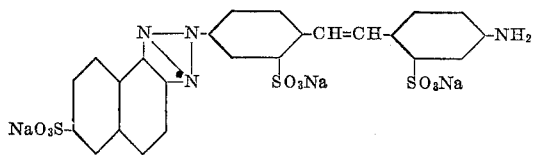

with 34.5 parts of the sodium salt of the monazo compound represented by the formula

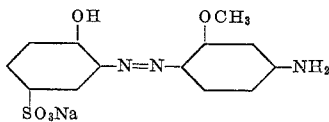

and with 47.4 parts of the disodium salt of 4,4'-dinitrostilbene-2,2'-disulfonic acid; dissolving the solid condensation product thus formed in aqueous ammonia containing a soluble copper salt, and heating until the product is coppered.

4. The coppered stilbene dyestuff made by condensing in the presence of a caustic alkali 66.8 parts of the trisodium salt of the aminotriazole represented by the formula

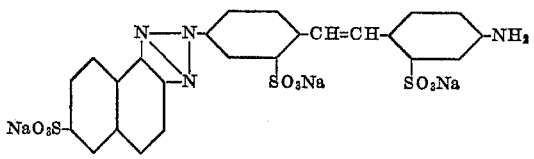

with 38 parts of the sodium salt of the monazo compound represented by the formula

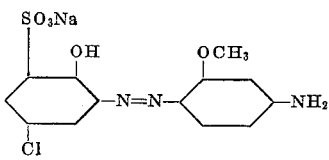

and with 47.4 parts of the disodium salt of 4,4'-dinitrostilbene-2,2'-disulfonic acid; dissolving the solid condensation product thus formed in aqueous ammonia containing a soluble copper salt, and heating until the product is coppered.

5. The coppered stilbene dyestuff made by condensing in the presence of a caustic alkali 66.8 parts of the trisodium salt of the aminotriazole represented by the formula

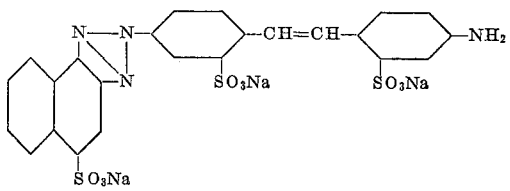

with 37.5 parts of the sodium salt of the monazo compound represented by the formula

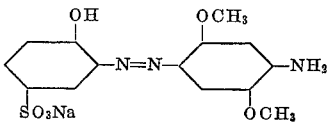

and with 47.4 parts of the disodium salt of 4,4'-dinitrostilbene-2,2'-disulfonic acid; dissolving the solid condensation product thus formed in aqueous ammonia containing a soluble copper salt and heating until the product is coppered.

ARTHUR HOWARD KNIGHT.

REFERENCES CITED

The following references are of record in the file of this patent:

UNITED STATES PATENTS

| Number | Name | Date |
|---|---|---|
| 2,004,250 | Schindhelm et al. | June 11, 1935 |
| 2,385,862 | Keller | Oct. 2, 1945 |
| 2,394,998 | Keller | Feb. 19, 1946 |

FOREIGN PATENTS

| Number | Country | Date |
|---|---|---|
| 427,241 | Great Britain | Apr. 17, 1935 |
| 555,867 | Great Britain | Sept. 10, 1943 |